(12) United States Patent
Roston

(10) Patent No.: US 11,303,466 B2
(45) Date of Patent: Apr. 12, 2022

(54) COMPACT ELECTRICAL DEVICE REMOTE CONTROLLER

(71) Applicant: Gerald P Roston, Saline, MI (US)

(72) Inventor: Gerald P Roston, Saline, MI (US)

( * ) Notice: Subject to any disclaimer, the term of this patent is extended or adjusted under 35 U.S.C. 154(b) by 414 days.

(21) Appl. No.: 16/525,847

(22) Filed: Jul. 30, 2019

(65) Prior Publication Data

US 2021/0036882 A1 Feb. 4, 2021

(51) Int. Cl.
*H04L 12/28* (2006.01)
*H04N 21/436* (2011.01)
*H02J 13/00* (2006.01)
*H01H 9/16* (2006.01)

(52) U.S. Cl.
CPC ......... *H04L 12/2803* (2013.01); *H01H 9/167* (2013.01); *H02J 13/0017* (2013.01); *H04N 21/43615* (2013.01); *H01H 2231/032* (2013.01); *H01H 2300/03* (2013.01); *H04L 2012/2841* (2013.01)

(58) Field of Classification Search
CPC ........ H04L 12/2803; H04L 2012/2841; H01H 9/167; H01H 2231/032; H01H 2300/03; H01H 50/021; H02J 13/0017; H02J 13/00022; H04N 21/43615; Y02B 70/30; Y04S 20/242
See application file for complete search history.

(56) References Cited

U.S. PATENT DOCUMENTS

| 7,092,772 B2 | 8/2006 | Murray et al. |
| 7,873,062 B2 | 1/2011 | Binder |
| 8,243,918 B2 | 8/2012 | Hazani et al. |
| 8,638,211 B2 | 1/2014 | Cohn et al. |
| 9,252,967 B2 | 2/2016 | Li et al. |
| 10,164,789 B2 | 12/2018 | Vijayrao et al. |

OTHER PUBLICATIONS

Aeon Labs Inc, Nano Switch User Guide, Apr. 24, 2018 available from https://web.archive.org/web/20180424231024/http://www.smarthome.com.au/media/manuals/Aeotec-Z-Wave-Nano-Switch-User-guide.pdf (Year: 2018).*
Aeon Labs Inc, Nano Switch User Guide, available from http://www.smarthome.com.au/media/manuals/Aeotec-Z-Wave-Nano-Switch-User-guide.pdf.

* cited by examiner

*Primary Examiner* — Tejal Gami

(57) ABSTRACT

An electronic system that controls existing electrical devices, such as those typically found in buildings such as electrical outlets and single-pole single-throw switches, which can include a circuit board upon which is mounted a connector block, a controllable switch, an AC-to-DC power converter, electrically conductive jumpers, and a control circuit. The electronic system further provides a radio means for communicating with a system controller, which may be local or remote, which provides commands for controlling the electrical device. The electronic system is configured to compactly connect with the existing electrical device by way of the electrically conductive jumpers and to fit within the confines of a single gang electrical box.

6 Claims, 8 Drawing Sheets

COMPACT ELECTRICAL DEVICE REMOTE CONTROLLER

BACKGROUND OF THE INVENTION

Field of the Invention

The present invention relates to home automation electronics. More particularly, the present invention relates to a compact control circuit that compactly connects with commonly deployed electrical outlets and switches and easily fits within the electrical boxes in which said outlets and switches are mounted without need for modification.

Description of the Related Art

One of the major 'revolutions' happening is the connecting of various devices to the Internet, which is known as the Internet-of-Things (IoT). The value of IoT is that individuals and businesses are provided with more detailed insights into various processes than ever before. IoT also provide for the remote controlling of connected devices, which provides tremendous utility. For example, during colder months, an Internet-connected thermostat can automatically lower its set point when a house's occupants leave the building and turn the set point back up when they come within a certain distance of the house.

However, currently commercially available embodiments of these technologies have a potential downside. All communication for the devices is routed through a 'centralized' server. 'Centralized', in this case, can mean a network of distributed, cloud-based servers—the key notion is that this service is controlled by a single entity. The problems with this approach are two-folds: First, should the centralized server be unable to respond, the IoT system will not perform the tasks desired of it. Second, the operator of the centralized server is provided with significant amounts of data about a user, which represents a significant invasion of privacy. For example, these systems know when a house's occupants wake up, when they leave the house, where they are when they are away from the house, etc. While some people are comfortable exchanging this information for the benefits received, others are not.

For those wanting to build their own systems, there do exist open source projects that provide much of the desired functionality. For example, the Home Assistant project, available at www.home-assistant.io, provides a highly capable, open-source platform that can integrate with a wide variety of devices. However, many of the devices, even when in communication with the locally-deployed instance of Home Assistant, still send information back to the devices' manufacturers.

A number of people have identified certain devices that can be end-user modified to work with software platforms such as Home Assistant without sending information backs to the devices' manufacturers. This process of modification typically requires making both hardware and software changes to the device, thus putting the process out of reach of most homeowners. Further, since the devices are not intended to be modified, attempts at modification can render the device unusable.

Further, there are essentially no devices, hackable or not, that seamlessly integrate into a home's existing electrical architecture. For instance, a good fraction of the IoT outlets on the market plug into existing outlets as opposed to replacing them. IoT switches, such as those used for lights, are all visually distinct from standard switches in that they use sliders, paddles, or some other means of control that does not look like a standard switch. Also, these devices tend to be physically bulky, making their installation tricky.

What is needed is a compact electrical device controller that provides a programming port and can be seamlessly integrated into a building's existing electrical system.

BRIEF SUMMARY OF THE INVENTION

In response to the difficulties and problems discussed herein, a compact electrical device controller is provided. Said compact electrical device controller controls electrical devices plugged into an existing outlet or connected to an existing single-pole single-throw electrical switch. The compact electrical device controller comprises a circuit board upon which is mounted a connector block, a controllable switch, an AC-to-DC power converter, a control circuit, and a programming port. The compact electrical device controller also provides a means for radio communicating with a remote system controller upon which the system scheduling/controlling software is executed. The compact electrical device controller is configured to compactly connect with an electrical device and fit within the confines of a single gang electrical box.

BRIEF DESCRIPTION OF THE SEVERAL VIEWS OF THE DRAWINGS

The detailed description set forth below references the following drawings.

DETAILED DESCRIPTION OF THE INVENTION

Figure 1:
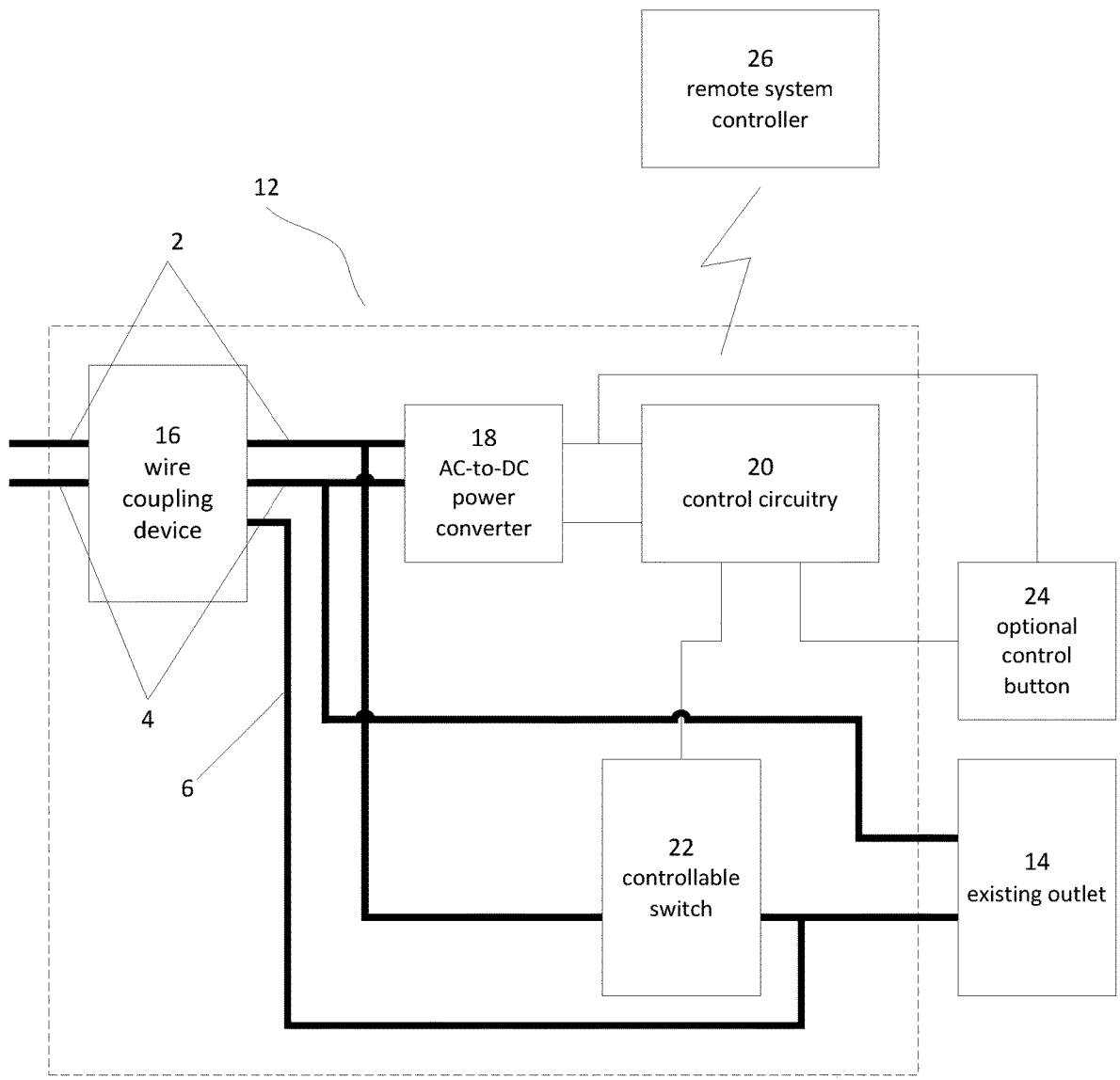
FIG. 1 is a block diagram of the present invention in combination with a standard 110 VAC duplex outlet.

The following description is merely exemplary in nature and is not intended to limit the present disclosure, application, or uses. It should also be understood that throughout the reference numerals indicate like or corresponding parts and features. In respect of the methods disclosed, the order of the steps presented is exemplary in nature, and thus, is not necessary or critical, unless otherwise noted. In addition, while much of the present invention is illustrated using specific examples, the present invention is not limited to these embodiments. All publications, patent applications, patents, and other references mentioned herein are incorporated by reference in their entireties. In case of conflict, the present specification, including definitions, will control.

The following definitions apply to certain terms used in the specification:

Compactly connect: A means of electrically coupling a circuit board to either an existing outlet or an existing single-pole single-throw switch that uses the shortest possible connection path between the two by taking advantage of wire press-in connector on the rear side of the existing outlet or the existing single-pole single-throw switch.

Existing outlet: Any standard electrical outlet singlex, duplex, etc., of any style, that is used in residential or commercial construction, with a current rating of up to around 20 A. The word 'existing' conveys the notion that these are standard devices, readily available on the market and that the current invention can be used for both new and retrofit applications.

Existing single-pole single-throw switch: Any standard electrical switch, of any style, that is used in residential or commercial construction, with a current rating of up to around 20 A. The word 'existing' conveys the notion that these are standard devices, readily available on the market and that the current invention can be used for both new and retrofit applications.

Programming port: A means for interfacing a programmable controller to a programming device. Said means for interfacing to a programming device are known in the art and include regularly spaced solder pads, plated holes, and a multi-contact connector. Said means for interfacing to a programming device also include using a device to convert from standard serial communications, such as universal serial bus (USB), to the microcontroller-required interface, typified by devices such as the Silicon Labs CP2102 USB to UART bridge.

Push-in port: A means for connecting an electrical wire to either an existing outlet or an existing single-pole single-throw switch that are found on the vast majority of such devices currently sold. Connecting to the device require simply stripping a specified length of the wire and pushing the stripped portion of the wire into the push-in port. A mechanism within the device provides both mechanical and electrical connectivity to the wire. To remove the wire, a tool, typically a small, flat blade screwdriver, is inserted into a slot adjacent to the push-in port and is used to release the device that holds the wire.

Radio communication: Any means for transceiving digital communications using radio-frequency bands, such as WiFi, ZigBee, Bluetooth, etc.

Remote system controller: A computer system physically separated from the present invention upon which software runs that sends and receives information from the present invention related to controlling and reporting the status of the present invention and any device, or devices, connected thereto. The software to providing this functionality is well known in the art and ranges from closed, commercially-deployed systems to open-source systems. The remote system controller can be local to the present invention, meaning located within the same local area network. The remote system can be remote from the present invention, meaning that it is located in the cloud and there is some means of forwarding the information from the present invention to the remote computer. A variety of such methods are known in the art.

FIG. 1 presents a block diagram of the present invention in combination with a standard 110 VAC duplex outlet. The primary components of the present invention are existing AC wires 2, 4, and 6, electrical circuit card 12, and existing outlet 14. Wire 2 represents the live, or hot, wire; wire 4 is the neutral wire, and wire 6 is a switched output wire. Note that the ground wire found in most house is not depicted, the ground wire remains attached to existing outlet 14 and its functionality is not effected by the use of the present invention. Also note that, for clarity, wires that carry 110 VAC are shown as heavy and wires that carry low voltage DC are lighter.

The primary elements of electrical circuit card 12, which consists of the items within the dashed line, are wire coupling device 16, AC-to-DC power converter 18, control circuitry 20, and controllable switch 22.

Wire coupling device 16 provides the means for securely, safely, and electrically connecting existing AC wires 2 and 4 to electrical circuit card 12. In an embodiment, wire coupling device 16 provides for connecting two external wires. In an embodiment, wire coupling device 16 provides for connecting three external wires. There are numerous means known in the art for providing such a connection including: a barrier block style terminal block with screw connectors, typified by TE Connectivity AMP Connectors part number 8PCR-02-006; a wire-to-board terminal block with spring connectors, typified by Phoenix Contact part number 1017521; a wire-to-board terminal block with a screw activated rising cage clamp, typified by Amphenol Anytek part number T70243500000G; and other devices and approaches known in the art. For the purposes of the present invention, since compactness is a key driver of the embodiment, preference is given to the smallest available devices.

AC-to-DC power converter 18 is used to power control circuitry 20 and to provide actuation power for controllable switch 22. As with other Internet-of-Things devices, the amount of power needed by the control circuitry is quite low, on the order of 50 mW to 500 mW at 3.3 VDC, i.e., a total power output of less than 1.5 W. There are numerous ways to provide this power that are known in the art. One approach is to use an encapsulated AC-to-DC converter, such as a CUI Inc part number VSK-S1-3R3U. Another approach is to construct a power supply, with architectures such as high-voltage buck converter, cap-drop supply, and flyback being known in the art as being applicable to this type of application.

Control circuitry 20 has three primary functions: to control the state of controllable switch 22, to radio-communicate with remote system controller 26, and to monitor optional control button 24. In an embodiment, control circuitry 20 comprises a microcontroller, for example a Microchip Technology part number ATXMEGA8E5-AUR; a WiFi radio module, for example a Silicon Labs WF111-A-V1; and additional necessary circuitry as known in the art. In an embodiment, one could replace the WiFi module with custom built WiFi hardware. In an embodiment, control circuitry 20 comprises an integrated microcontroller/WiFi module, for example a Espressif ESP8266.

Control circuitry 20 also includes a radio antenna, tuned for one or more appropriate radio communications frequencies and at least one programmable I/O port. In an embodiment, control circuitry 20 also includes a programming port.

Controllable switch 22 is functionally equivalent to a relay and must be capable of safely conducting the same amount of current as for which existing outlet 14 is rated, typically up to 20 amps. In an embodiment, controllable switch 22 is a single-pole double throw relay, such as an Omron part number G6RL-1A DC3. With this embodiment, only the live wire 2 is disconnected from the outlet. In an embodiment, a double pole double throw relay can be used, thereby allowing both the live 2 and neutral 4 wires to be interrupted. In an embodiment, a single-pole single-throw solid-state relay can be used, such as Sensata-Crydom part number CMX60D10. In an embodiment, controllable switch 22 may be a bistable device, that is, it can be a device that remembers the last commanded state even if power is removed from the circuit. As with the other elements of the present invention, preference is given to physically smaller devices to help achieve the goal of compactness.

Figure 9:
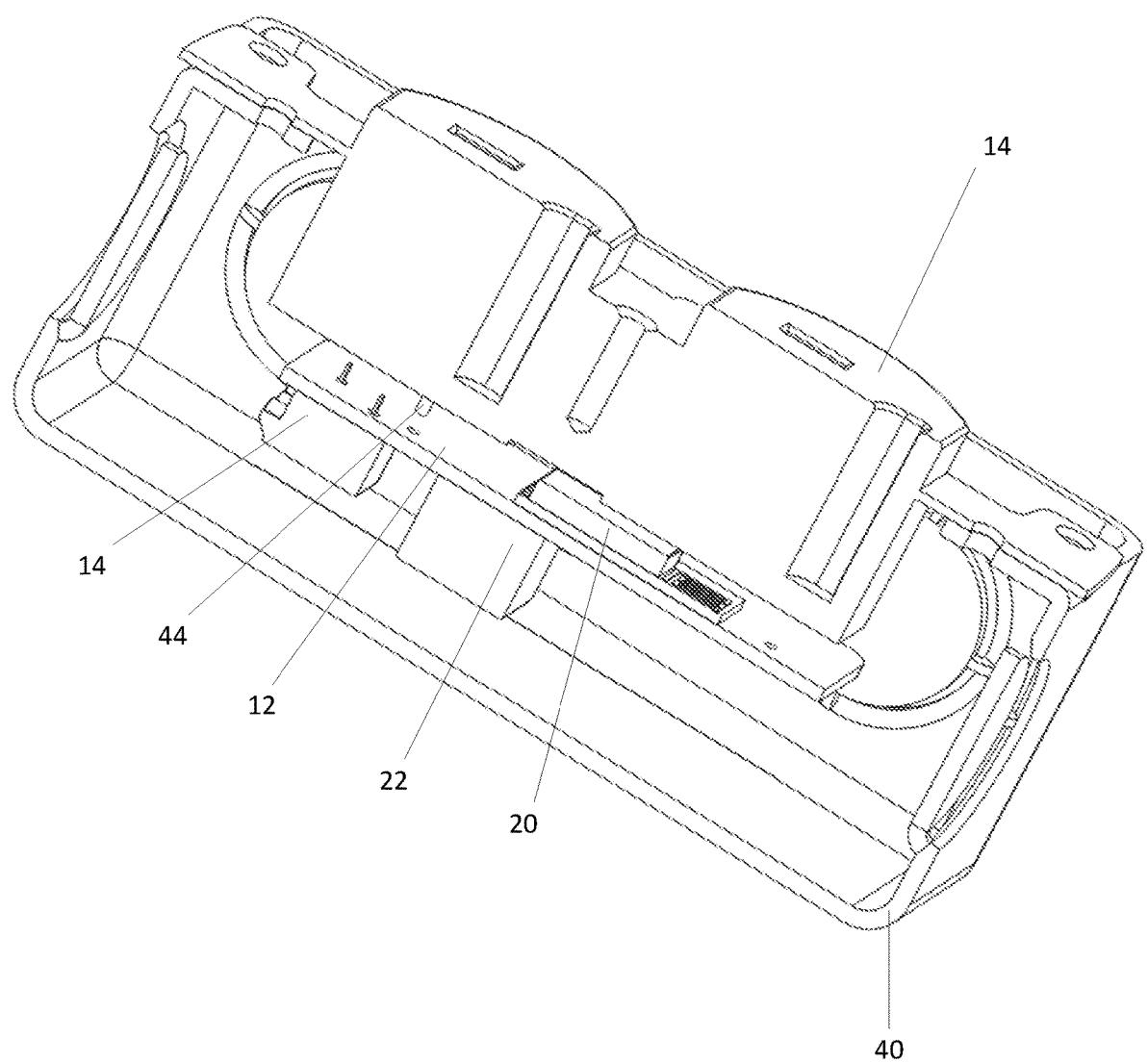
FIG. 9 shows a cross-section of the present invention, the embodiment depicted in FIG. 1, deployed in an electrical box.

The live input of existing outlet 14 is connected to switched output wire 6 and the neutral input of existing outlet 14 is connected to neutral wire 4. FIG. 9 provide more details about the manner in which this connection is made to optimize compactness.

Optional control button 24 provides a means for locally controlling the device plugged into existing outlet 14 without changing the switch position of said device. For example, said device may be a lamp which is scheduled to be turned off as a particular time of the night. For this to work, the switch that is a part of the lamp has to be left on, with control coming from electrical circuit card 12. If it is desired, for example, to turn the lamp off early one evening, using the switch that is a part of the lamp is not a good approach because then the lamp will not turn on the next day. While the web-based interface associated with remote system controller 26 can be used to control the state of the device, using a browser interface or phone app, optional control button 24 provides another means for controlling the device. Optional control button 24 is a switch, typically a momentary switch, that is collocated with existing outlet 14. In an embodiment, one side of the switch is connected to the positive DC supply voltage and the other side is connected to an I/O pin of control circuitry 20 where said pin is programmed to be pulled down. In an embodiment, one side of the switch is connected to ground and the other side is connected to an I/O pin of control circuitry 20 where said pin is programmed to be pulled up.

Figure 2:
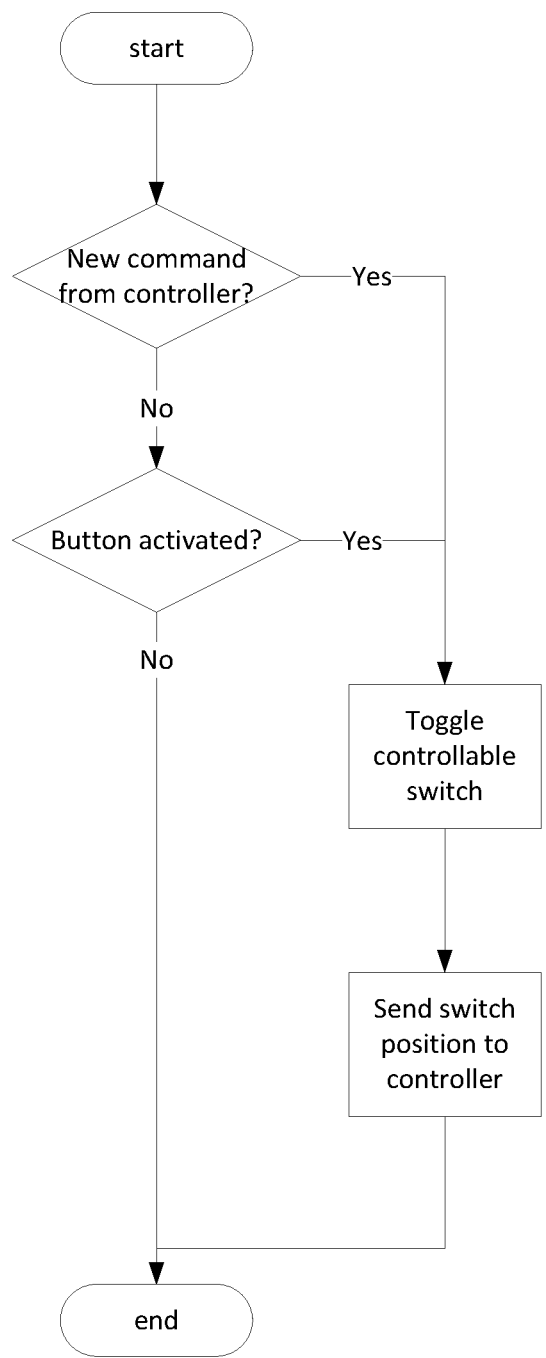
FIG. 2 is a flow diagram of the software that runs on the system of FIG. 1.

FIG. 2 presents a flow diagram of an embodiment of the software that runs on control circuitry 20 when electrical circuit card 12 is adapted to interface with existing outlet 14. As is typical of real-time control devices, the microcontroller sleeps for most of the time, waking up periodically to run the software. In a typical embodiment, the microcontroller wakes up from one to 100 times per second.

When control circuitry 20 wakes up, it checks to see if it has received a command from remote system controller 26 or from the optional control button 24. Should either remote system controller 26 or from the optional control button 24 have sent a command, control circuitry 20 sends the appropriate command to controllable switch 22. Typically, this means that an digital output line will either be tied to ground or held high. If the position of controllable switch 22 is changed, control circuitry 20 sends the current state of controllable switch 22 to remote system controller 26. If controllable switch 22 is a bistable device, an additional step of determining controllable switch's 22 switches position may be incorporated into the process.

The flow diagram depicted in FIG. 2 is the simplest such process that will provide the necessary functionality for the present invention. Other more capable software system that can be deployed on the present invention are known in the art. For example, the KmanSonoff—Alternative firmware for SOnOff Switches, available on GitHub, could be easily adapted to run on the present invention.

Figure 3:
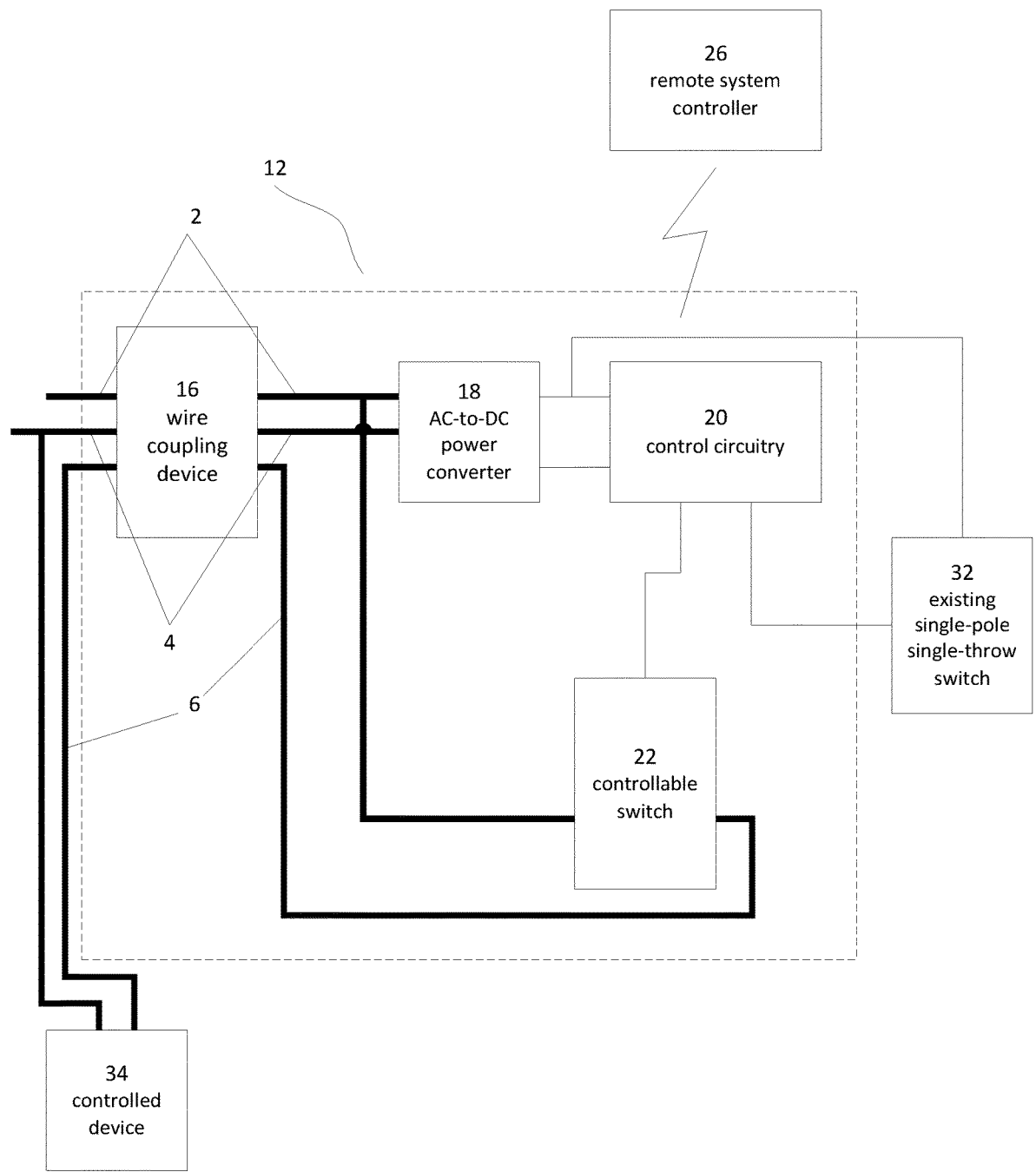
FIG. 3 presents a block diagram of the present invention in combination with a standard 110 VAC single-pole single-throw switch.

FIG. 3 presents a block diagram of the present invention in combination with a standard 110 VAC single-pole single-throw switch. The primary components of the present invention are existing AC wires 2, 4, and 6, electrical circuit card 12, and existing single-pole single-throw switch 32. Note that the ground wire found in most house is not depicted, the ground wire remains attached to existing single-pole single-throw switch 32 and its functionality is not effected by the use of the present invention The primary elements of electrical circuit card 12, which consists of the items within the dashed line, are wire coupling device 16, AC-to-DC power converter 18, control circuitry 20, and controllable switch 22. Each of these components is the same as described in FIG. 1. That these components are the same provides significant value as this allows a single electrical circuit card 12 to be used for two distinct applications, one with an existing outlet 14 and one with existing single-pole single-throw switch 32. As detailed in the following paragraphs, the only difference between these two applications is the manner in which electrical circuit card 12 is connected to a building's existing circuitry.

As wired in a building, neutral wire 4 would typically comprise two distinct wires, one coming from the source of electricity the other coming from controlled device 34. Since electrical circuit card 12 needs to be connected to neutral wire 4, in an embodiment, the wire nut connecting the two existing wires would be removed and a jumper wire from the wire nut to electrical circuit card 12 would be installed. This approach results in further crowding of the box into which existing single-pole single-throw switch 32 is mounted. In an embodiment, wire coupling device 16 can provide for connecting four external wires. To avoid the need for the jumper wire previously described, two of the pins of wire coupling device 16 can be coupled, providing two connections for neutral wires. This approach actually reduces the crowing of the box into which existing single-pole single-throw switch 32 is mounted.

A building would be wired such that controlled device 34 would be wired to existing single-pole single-throw switch 32. To allow for remotely controlling controlled device 34, the hot line feeding controlled device 34 is connected to switched output wire 6 at wire coupling device 16. In this manner, controllable switch 22 has replaced the existing single-pole single-throw switch 32.

Figure 10:
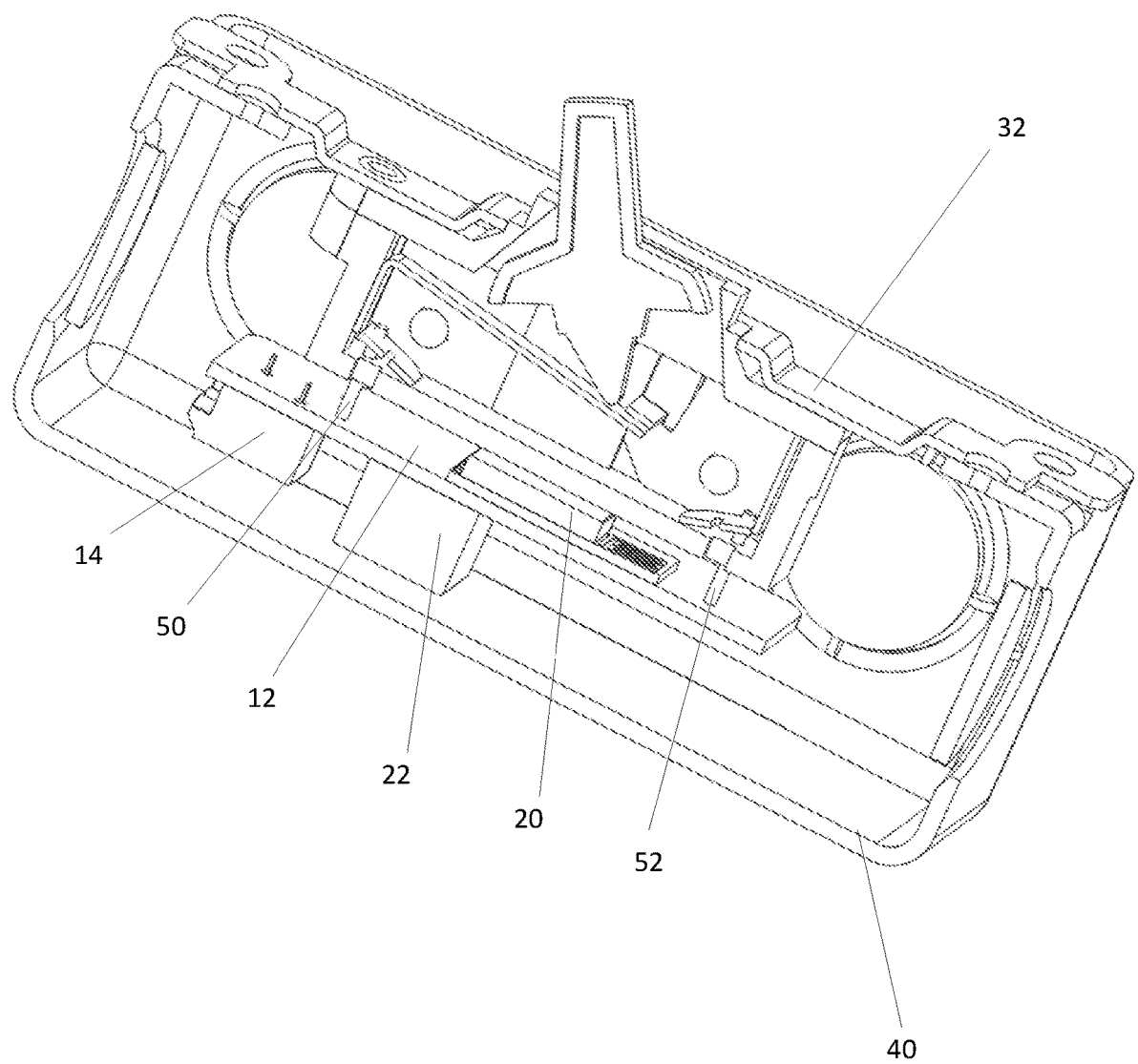
FIG. 10 shows a cross-section of the present invention, the embodiment depicted in FIG. 3, deployed in an electrical box.

Existing single-pole single-throw switch 32 is connected to control circuitry 20 in the same manner as optional control button 24. FIG. 10 provides more details about the manner in which this connection is made to optimize compactness.

Figure 4:
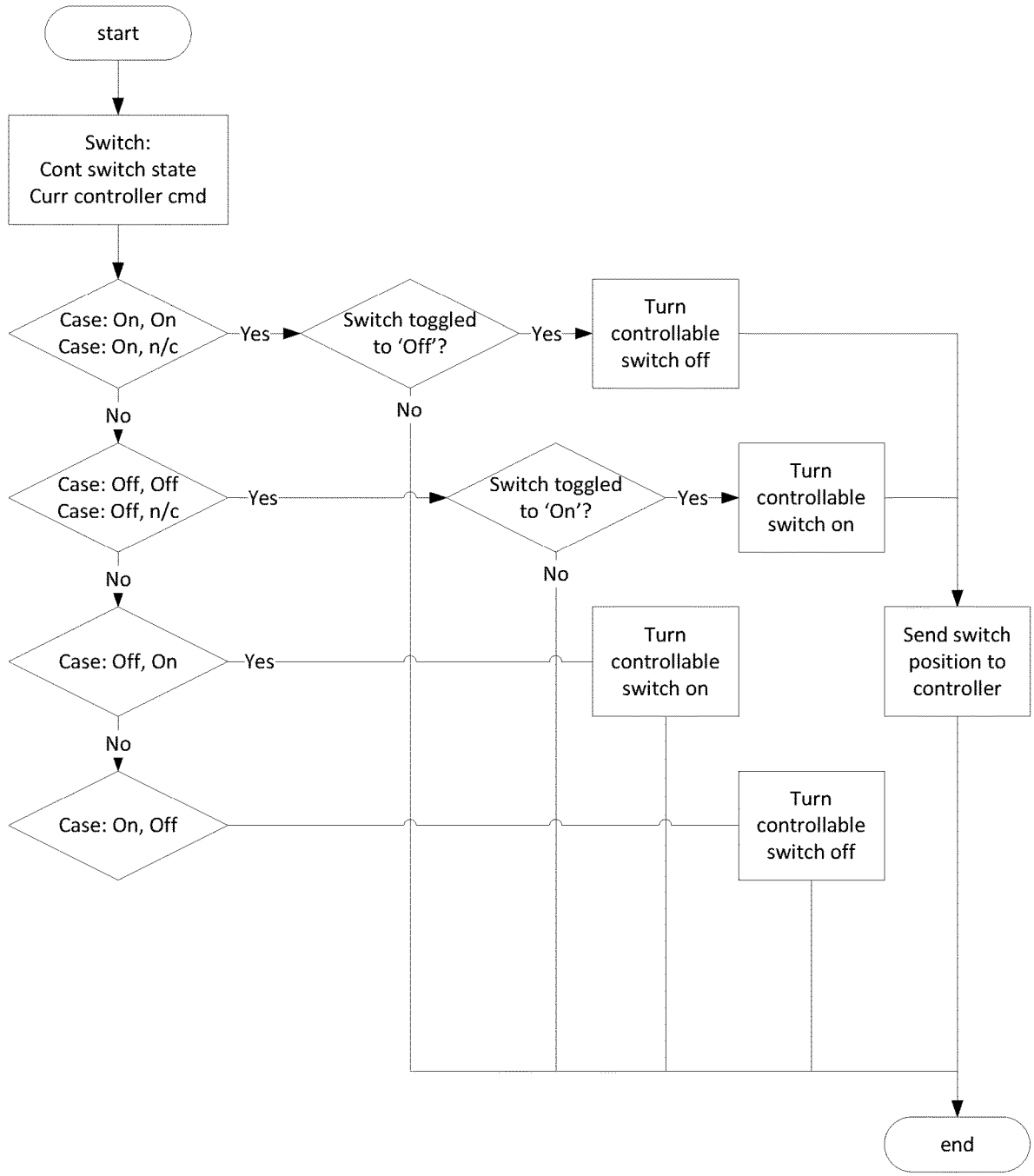
FIG. 4 is a flow diagram of the software that runs on the system of FIG. 3.

FIG. 4 presents a flow diagram an embodiment of the software that runs on control circuitry 20 when electrical circuit card 12 is adapted to interface with existing single-pole single-throw switch 32. This flow diagram is necessarily more complex than that depicted in FIG. 2 for the following reason: in the embodiment depicted in FIG. 1, optional control button 24 is a momentary switch, thus the signal from remote system controller 26 and the signal from optional control button 24 can never be in conflict. In the embodiment depicted in FIG. 3, existing single-pole single-throw switch 32 is, by definition, a bi-stable switch, thus conflicts between its state and the commanded state from remote system controller 26 can conflict.

In an embodiment, a way to address potential conflicts is by driving the software on positional transitions of existing single-pole single-throw switch 32 as opposed to its static state.

When control circuitry 20 wakes up, its course of action depends on the current state of controllable switch 22 and any command received from remote system controller 26.

In the case that controllable switch 22 is 'on' and either no command is received from remote system controller 26 of the command received is 'on', the system looks to see if existing single-pole single-throw switch 32 was turned 'off'. If it was, controllable switch 22 is turned 'off' and the new state of controllable switch 22 is sent to remote system controller 26.

In the case that controllable switch 22 is 'off' and either no command is received from remote system controller 26 of the command received is 'off', the system looks to see if existing single-pole single-throw switch 32 was turned 'on'. If it was, controllable switch 22 is turned 'on' and the new state of controllable switch 22 is sent to remote system controller 26.

In the case that controllable switch 22 is 'off' and an 'on' command is received from remote system controller 26, controllable switch 22 is turned 'on'.

In the case that controllable switch 22 is 'on' and an 'off' command is received from remote system controller 26, controllable switch 22 is turned 'off'.

The flow diagram depicted in FIG. 4 is the simplest such process that will provide the necessary functionality for the present invention. Other more capable software systems that can be deployed on the present invention are known in the art.

Figure 5:
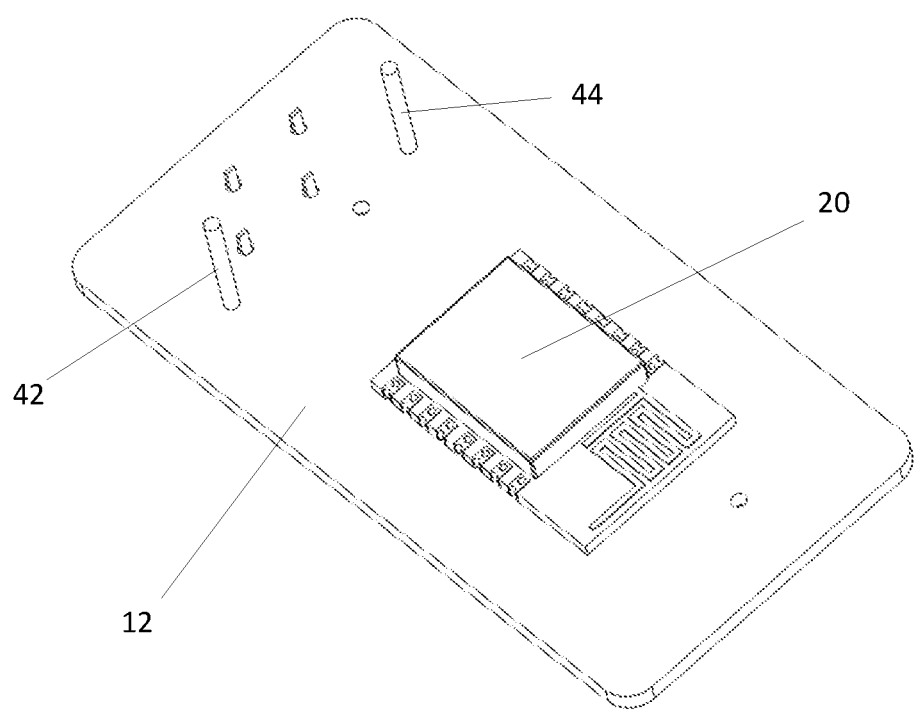
FIG. 5 shows side one of the electrical circuit that embodies FIG. 1.
Figure 6:
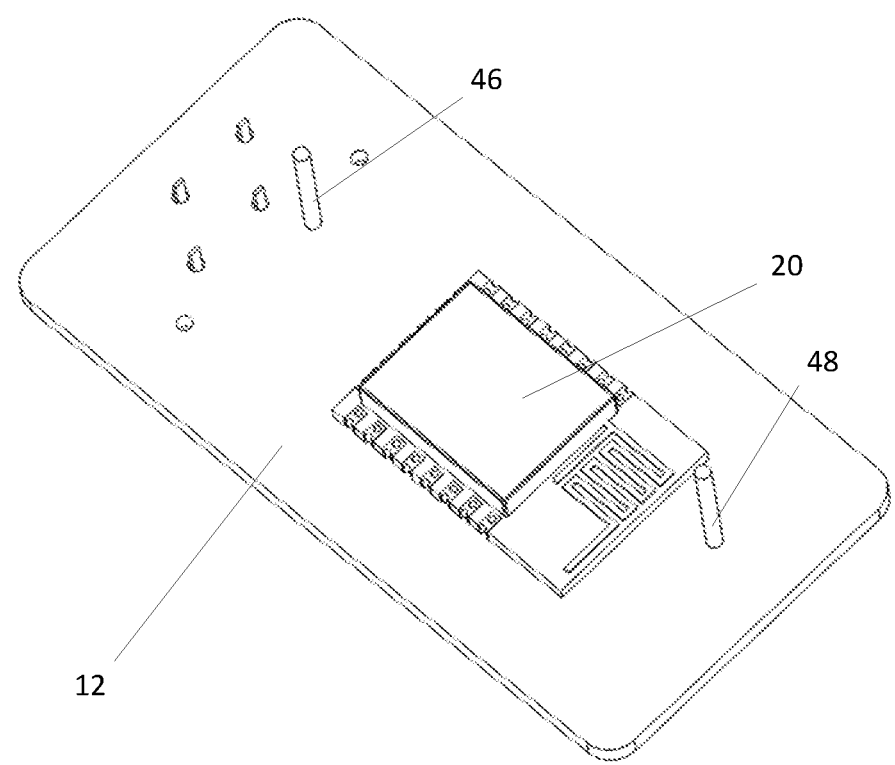
FIG. 6 shows side one of the electrical circuit that embodies FIG. 3.
Figure 7:
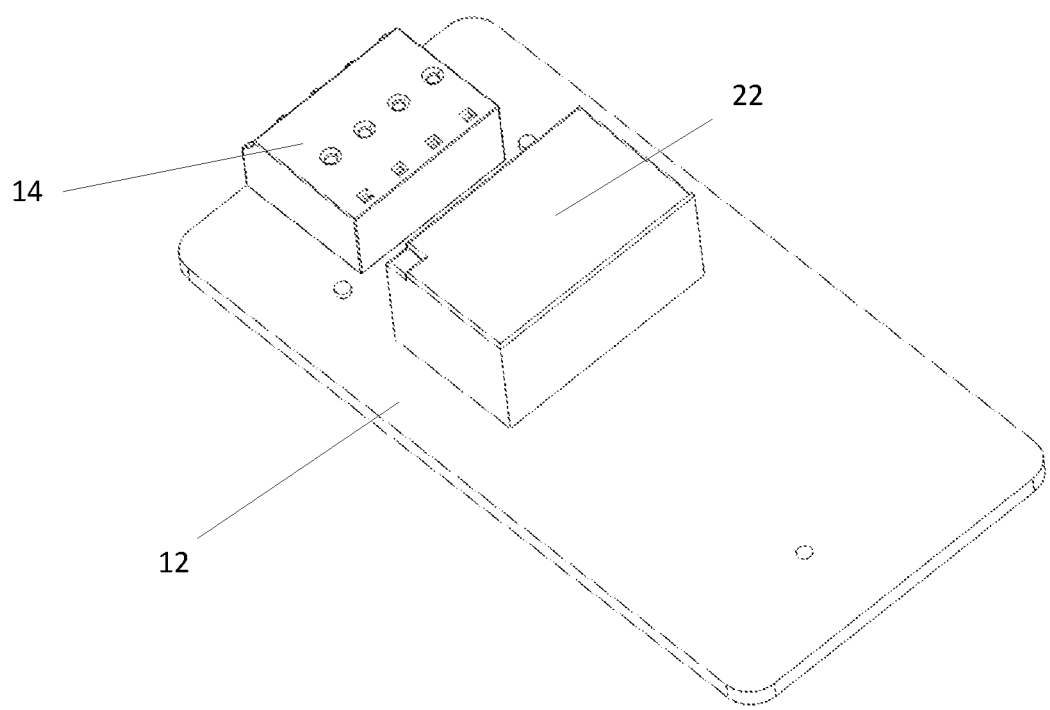
FIG. 7 shows side two of the electrical circuit that embodies FIGS. 1 and 3.

FIG. 5 shows an embodiment of side one of electrical circuit card 12 configured for use with the block diagram of FIG. 1. FIG. 6 shows an embodiment of side one of electrical circuit card 12 configured for use with the block diagram of FIG. 3. FIG. 7 shows an embodiment of side two of electrical circuit card 12 that can be used with both the block diagram of FIG. 1 and FIG. 3.

In FIG. 5, mounted on side one of electrical circuit card 12 is control circuitry 20; jumper 42, which is the physical embodiment of that portion of neutral line 4 that spans between coupling device 16 and existing outlet 14; and jumper 44, which is the physical embodiment of that portion of switched output wire that spans between controllable switch 22 and existing outlet 14. In an embodiment, jumpers 42 and 44 are short pieces, approximately 12 mm long, of 16 awg copper wire.

In FIG. 6, mounted on side one of electrical circuit card 12 is control circuitry 20; jumper 46, which is the physical embodiment of the line from the positive DC supply voltage to existing single-pole single-throw switch 32; and jumper 48, which is the physical embodiment of the line from the I/O pin of control circuitry 20 to existing single-pole single-throw switch 32. In an embodiment, jumpers 46 and 48 are short pieces, approximately 12 mm long, of 16 awg copper wire. Though this gauge of wire is not necessary from a load carrying perspective, it does enable the compact footprint detailed in FIG. 10.

The sole difference between FIGS. 5 and 6 is position of jumpers 42 and 44 as compared to jumpers 46 and 48. As clearly depicted, a single instantiation of electrical circuit card 12 can support both sets of jumpers, thereby increasing the value of the current invention as it allows a single hardware component to support two distinct applications.

In FIG. 7, mounted on side two of electrical circuit card 12 is coupling device 16 and controllable switch 22. Coupling device 16 depicted provides for connecting four external wires, further demonstrating that a single embodiment of electrical circuit card 12 can be used to realize the systems depicted in FIGS. 1 and 3.

Not depicted is AC-to-DC power converter 18 as it is known in the art that the approaches identified are all quite compact and can be easily accommodated.

In an embodiment, the entirety of electrical circuit card 12 and the components thereon are such that the device can be awarded UL, CE, and/or other similar certifications.

Figure 8:
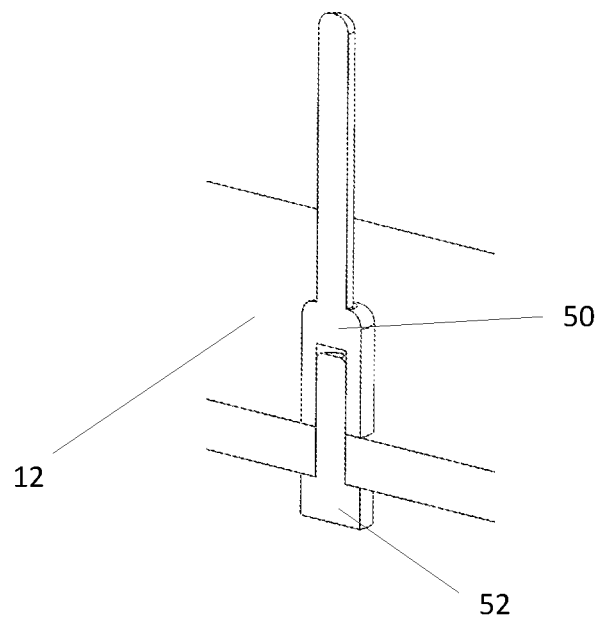
FIG. 8 shows a pin for providing compact connecting that does not require soldering.

If the jumper 42, 44, 46, and 48, are pieces of electrically conductive wire, they would need to be soldered into electrical circuit card 12. To further increase the utility of the present invention, electrical circuit card 12 can provide a multiplicity of holes for accepting jumpers, where the holes align with the push-in wire connector opening for a variety of existing outlets and existing single-pole single-throw switches. To obviate the need for the end-user to solder wires into these holes, a jumper such as that depicted in cross-section in FIG. 8 can be deployed. This jumper comprises two components, pin 50 and pin fastener 52. The diameter of pin 50 should be about the same as the diameter of a 16 awg copper wire. Pin 50 is placed above the desired hole in electrical circuit card 12 and pin fastener 52 is inserted through said hole to secure pin 50 to electrical circuit card 12. Means of fastening are known in the art and include screw threads, snaps, press fits, etc.

FIG. 9 shows a cross-section of the present invention, the embodiment depicted in FIG. 1, deployed in an electrical box. Existing outlet 14 is mounted into single gang box 40, with electrical circuit card 12 occupying a portion of the available space between existing outlet 14 and the rear wall of single gang box 40. This compact deployment is enabled by a) the fact that most duplex outlets provide push-in wire connectors on the rear of said duplex outlet and b) the positioning of jumpers 42 and 44 to align with the push-in wire connectors. In an embodiment, additional mechanical support is provided at the juncture of jumpers 42 and/or 44 and electrical circuit card 12, thereby allowing the wires to additionally serve as the mechanical support for the present invention and obviating the need for mechanical fastening.

To deploy the present invention as shown in FIG. 9, the following simple steps are followed:

1. Depower the circuit to which existing outlet 14 is connected and unscrew existing outlet 14 from single gang box 40.

2. Release hot wire 2 and neutral wire 4 from existing outlet 14 by inserting a small, bladed screw driver into the release slots on the back of existing outlet 14.

3. Insert hot wire 2 and neutral wire 4 into the proper openings on coupling device 16.

4. Align jumpers 42 and 44 with the push-in wire connector openings on the back of existing outlet 14 and push to fully engage jumpers. Note that jumper 42 is not visible in FIG. 9 because of its position relative to the cross-section plane.

5. Screw existing outlet 14 back into single gang box 40 and reapply power to the circuit.

In the depicted embodiment, the distance from the rear of existing outlet 14 to the wall of single gang box 40 is approximately 22 mm, but it should be noted that duplex outlets deeper than the one predicted are regularly used. Thus, to enable the present invention to be deployed in the widest possible number of situation, the height of the present invention must be less than about 22 mm and preferably less than about 16 mm; and it should be less than about 90 mm in length and 45 mm in width. In contrast, one of the smallest devise presently available, the SOnOff Basic, has a height of 24 mm, but more importantly, does not provide a means for connecting to an outlet akin to that of jumper 42 and 44; thus the SOnOff Basic device cannot be used in a single gang box—there is simply insufficient space for it.

In an embodiment in which existing outlet 14 does not provide push-in wire connectors, jumper 42 and 44 can be made longer, approximately 40 mm in total length, and they can be bent to wrap around to the screw mounts available on the sides of all duplex outlets.

FIG. 10 shows a cross-section of the present invention, the embodiment depicted in FIG. 3, deployed in an electrical box. Existing single-pole single-throw switch 32 is mounted into single gang box 40, with electrical circuit card 12 occupying a portion of the available space between existing single-pole single-throw switch 32 and the rear wall of single gang box 40. This compact deployment is enabled by a) the fact that most electrical switches provide push-in wire connectors on the rear of said electrical switch and b) the positioning of jumpers 46 and 48 to align with the push-in wire connectors.

To deploy the present invention as shown in FIG. 10, the following simple steps are followed:

1. Depower the circuit to which existing single-pole single-throw switch 32 is connected and unscrew existing single-pole single-throw switch 32 from single gang box 40.

2. Release hot wire 2 and switched output wire 6 from single-pole single-throw switch 32 by inserting a small, bladed screw driver into the release slots on the back of single-pole single-throw switch 32.

3. Remove wire nut that connects the neutral wire to the neutral wire 4 coming from the device controlled by existing single-pole single-throw switch 32.

4. Insert hot wire 2, switched output wire 6, and both neutral wires 4 into the proper openings on coupling device 16.

5. Align jumpers 46 and 48 with the push-in wire connector openings on the back of existing single-pole single-throw switch 32 and push to fully engage jumpers.

6. Screw existing single-pole single-throw switch 32 back into single gang box 40 and reapply power to the circuit.

As is evidenced from the descriptions of FIGS. 9 and 10, the current invention allows the typical homeowner to easily deploy the present invention without requiring special tools, skills, or requiring the hiring of an electrician. Further, the present invention provides said homeowner with all of the benefits of a home automation system without changing the appearance of the home or requiring a remotely hosted automation control service.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein as other present disclosures in other patent documents is hereby unconditionally reserved.

What is claimed is:

1. An electronic system that controls electrical devices comprising:
    a circuit board comprising a connector block configured to connect to an AC power source,
    a controllable switch,
    an AC-to-DC power converter,
    first and second electrically conductive jumpers, and
    a control circuit, the circuit board configured to connect to an electrical outlet or switch having first and second wire push-in ports;
an antenna for radio communicating with a remote system controller;
wherein the first electrically conductive jumper extends from the circuit board at a first location and is configured to engage the first wire push-in port on the electrical outlet or switch when the first wire push-in port is aligned with the first location on the circuit board, and further wherein the second electrically conductive jumper extends from the circuit board at a second location and is configured to engage the second wire push-in port on the electrical outlet or switch when the second wire push-in port is aligned with the second location on the circuit board.

2. The electronic system of claim 1 wherein the electrical device is an existing power outlet.

3. The electronic system of claim 1 wherein the electrical device is an existing single-pole single-throw switch.

4. The electronic system of claim 1 wherein the connector block provides between two and four connection points.

5. The electronic system of claim 1 wherein said compact coupling provides both electrical and mechanical connectivity.

6. The electronic system of claim 1 wherein said control circuit provides a programming port.

* * * * *